United States Patent
Bermes

(10) Patent No.: US 6,708,772 B2
(45) Date of Patent: Mar. 23, 2004

(54) CONTAINER VALVE WITH TRIPPING DEVICE FOR STATIONARY FIRE EXTINGUISHING PLANTS

(75) Inventor: Karl Bermes, Irrel (DE)

(73) Assignee: Luxembourg Patent Company S.A., Luxembourg (LU)

( * ) Notice: Subject to any disclaimer, the term of this patent is extended or adjusted under 35 U.S.C. 154(b) by 0 days.

(21) Appl. No.: 10/257,568

(22) PCT Filed: Apr. 18, 2001

(86) PCT No.: PCT/EP01/04389

§ 371 (c)(1),
(2), (4) Date: Oct. 15, 2002

(87) PCT Pub. No.: WO01/80955

PCT Pub. Date: Nov. 1, 2001

(65) Prior Publication Data

US 2003/0102137 A1 Jun. 5, 2003

(30) Foreign Application Priority Data

Apr. 20, 2000 (LU) ................................................ 90567

(51) Int. Cl.⁷ ........................... A62C 37/36; F16K 31/12
(52) U.S. Cl. .............................. 169/19; 169/20; 169/22; 251/30.04; 251/28
(58) Field of Search .............................. 169/19, 20, 22, 169/21, 65, 37, 40, 90, 42; 239/DIG. 15; 251/30.04, 28, 30.03, 29, 37, 38

(56) References Cited

U.S. PATENT DOCUMENTS

| 3,788,400 A | * | 1/1974 | Tufts ........................... 169/11 |
|---|---|---|---|
| 3,860,073 A | * | 1/1975 | Willms ......................... 169/20 |
| 3,903,914 A | * | 9/1975 | Topham-Clements .... 137/68.23 |
| 4,231,393 A | | 11/1980 | Byfuglien |
| 5,628,489 A | * | 5/1997 | Woodman ...................... 251/29 |
| 5,653,291 A | * | 8/1997 | Sundholm ..................... 169/20 |
| 5,954,138 A | * | 9/1999 | Gabriel ......................... 169/20 |

FOREIGN PATENT DOCUMENTS

| DE | 26 11 653 | 9/1977 |
|---|---|---|
| EP | 0 646 744 A1 | 4/1995 |

* cited by examiner

Primary Examiner—Michael Mar
Assistant Examiner—Darren Gorman
(74) Attorney, Agent, or Firm—Nath & Associates PLLC; Gary M. Nath; Jerald L. Meyer

(57) ABSTRACT

A container valve for fixed fire extinguishing systems comprises a valve body (12), a closure piston (26), one sealed end of which is introduced into the release chamber (24) and the opposite end of which has a sealing surface which can be pressed against a valve seat (22). Said closure piston (26) has a pressure compensation channel (36). A closing spring (32) exerts a spring force on the closure piston (26) in the direction of the valve seat (22). A trigger device (46) enables a drop in pressure to be created in the release chamber (24), in such a way that the closure piston (26) is displaced away from its valve seat (22), coming to rest against an end stop. A sealing element (38) seals the pressure compensation channel when the closure piston (26) rests against the end stop. Said sealing element (38) can be displaced from the exterior between a sealing position and a filling position, whereby in the sealing position, it seals the pressure compensation channel (36) of the closure piston (26) when the latter is in its end position, and in the filling position, it exposes the pressure compensation channel (36) of the closure piston (26) when the latter is in its end position.

11 Claims, 2 Drawing Sheets

CONTAINER VALVE WITH TRIPPING DEVICE FOR STATIONARY FIRE EXTINGUISHING PLANTS

The present invention relates to a container valve with a tripping device for stationary fire extinguishing plants.

PRIOR ART

Great demands are made on a container valve with a tripping device for stationary fire extinguishing plants. It has to: (1) securely block the gas pressure in the extinguishing substance container until the plant is released (in high-pressure plants, the gas pressure in the container can be more than 300 bar); (2) be reliably releasable by a tripping mechanism as simple as possible; (3) offer the emanating extinguishing substance only a low resistance to flow (i.e. comprise a valve seat with a large cross-section); and (4) remain securely opened after the release.

Most of the container valves with a tripping device for stationary fire extinguishing plants are today embodied as so-called articulated-lever valves. However, these valves have the disadvantage that they require a relatively high tripping force for actuating the articulated lever. It has therefore been already proposed to construct container valves with a tripping device for stationary fire extinguishing plants as differential pressure valves. Such a differential pressure valve comprises a closing piston which is mounted in a valve body to be slidably movable in the axial direction and comprises a sealing face at a first end with which it can be pressed against a valve seat. The opposite end of the closing piston is introduced in a tripping chamber to seal it and here embodies a pressure face which is larger than the free cross-section of the valve seat. A pressure compensation channel transverses the closing piston and connects the tripping chamber with an inlet channel. When the valve is closed, in the tripping chamber thus the same pressure resides as in the inlet port. This means that a force of pressure is exerted on the closing piston in the direction of the valve seat keeping the valve securely closed. The valve further comprises a tripping device which generates a pressure drop in the tripping chamber when a release is effected. After the reduction of the counter-pressure in the tripping chamber, a force of pressure acts on the closing piston which presses it away from its valve seat against a limit stop. By this action, the valve opens, so that the pressure medium can flow through the valve seat into the outlet port. The limit stop for the closing piston is formed by a sealing plate against which the mouth of the pressure compensation channel is pressed. That means that in this position the pressure compensation channel is sealed against the tripping chamber, so that no more counter-pressure can form in the tripping chamber, not even if the pressure is no longer reduced via the tripping device. In other words, the valve remains securely opened after the release. In order to close the valve of the emptied container, the tripping chamber is vented via the tripping device, so that a closing spring can press the closing piston onto the valve seat.

In stationary fire extinguishing plants, however, such differential pressure valves could not yet succeed as an alternative to articulated-lever valves. This is among others due to the fact that the filling of the pressure container with such differential pressure valves is relatively difficult. Indeed, the filling cannot be effected via the connecting piece of the valve, as in the process the closing piston would be pressed into its sealed end position and one would have no more possibility of closing the valve. It has therefore been proposed to arrange a separate filler port below the valve seat. However, even with this separate filler port, the filling must be effected extremely carefully, as in case of a fast increase of pressure in the filler port, the closing piston can be lifted from its valve seat.

OBJECT OF THE INVENTION

Therefore, the object, among others, underlying the present invention is to propose a container valve with a tripping device for stationary fire extinguishing plants in a differential pressure construction which enables an easy filling of the container.

GENERAL DESCRIPTION OF THE INVENTION

According to the invention, this object is achieved by a valve according to claim 1. The valve according to the invention also comprises, as do the differential pressure valves described in the beginning, a sealing element which seals the pressure compensation channel in the closing piston, when the latter is in its end position. In contrast to the known valves, however, this sealing element is not fixed in the valve body but can be actuated from the outside between a sealing position and a filling position, wherein in the sealing position it seals the pressure compensation channel of the closing piston in the end position and in the filling position it trips the pressure compensation channel of the closing piston in the end position. Now, the valve can be directly filled via the outlet port. In correspondence to a preferred procedure, the sealing element is brought into its filling position before the filling operation. The dynamic forces exerted on the closing piston by the incoming filling flow are in fact in most cases sufficient for holding the closing piston in an open position against the action of the closing spring. If, however, the filling flow is interrupted, the dynamic forces of pressure acting on the closing piston disappear. The resultant of the static forces of pressure acting on the closing piston also equals zero as the sealing element is in the filling position and the container pressure can consequently constitute via the open pressure compensation channel in the tripping chamber. The closing piston is thus in pressure equilibrium and is now pressed onto the valve seat by the spring force of the closing spring. To summarize, one can say that the valve closes immediately after the interruption of the filling flow if the sealing element has been brought into its filling position before the filling operation. Instead of bringing the sealing element into its filling position before the filling, it is also possible to effect the filling with the sealing element being in the sealing position. For the valve to close, the sealing element then has to be brought into the filling position after the interruption of the filling flow. This procedure is to be employed if the forces of flow during the filling are not sufficient for retaining the closing piston in an open position. With both procedures, the sealing element is returned to its sealing position after the filling in order to prepare the valve for the next release.

The sealing element can still be a sealing plate against which the mouth of the pressure compensation channel is pressed. In this embodiment, however, there is the problem that this sealing plate also has to fulfill the function of a buffer for the accelerated closing piston. In the process, the sealing plate is in most cases deformed by the relatively small sealing face surrounding the mouth of the pressure compensation channel such that it has to be exchanged already after the first release of the valve. The present invention has also solved this problem. That is, it is proposed to form the sealing element by a pin in the tripping chamber which can be introduced into the pressure compensation channel, the sealing being effected radially via an O-ring. In this embodiment with a radial sealing, the sealing element no longer has to fulfill a buffer function so that it does not have to be exchanged after every release. A separate annular buffer element which has essentially the same external diameter as the tripping chamber and thus a relatively large buffer face can then far more effectively cushion the impact of the closing piston on the limit stop.

The tripping device advantageously comprises a control valve integrated in the container valve and advantageously having the following design. A vent channel ends in the tripping chamber, a control valve seat facing the tripping chamber. A closing body is assigned to the control valve seat such that the pressure in the tripping chamber presses the closing body axially against the control valve seat of the vent channel, wherein the closing body seals the vent channel. An operating tappet to be accessed from the outside makes it possible to press the closing body away from its control valve seat in order to vent the tripping chamber.

A particular compact and simple valve design is achieved by arranging the control valve in the axial extension of the pressure compensation channel and forming the sealing element by a pin at the closing body of the control valve. As already described above, this pin can be axially introduced into the pressure compensation channel of the closing piston, the sealing between the pin and the pressure compensation channel being effected radially via an O-ring.

In an advantageous, particularly simple embodiment, this control valve then furthermore comprises a control valve body in which the vent channel and the control valve seat are arranged, with this control valve body being screwed from the outside between a first and a second position. In the first position, the pin seals the pressure compensation channel via the O-ring if the closing body abuts the control valve seat and the closing piston is in its end position. In the second position, the pin opens the pressure compensation channel to the tripping chamber if the closing body abuts the control valve seat and the closing piston is in its end position.

The tripping device further comprises an operating device for the control valve, which can be simply pinned onto the valve body in an advantageous embodiment. The control valve body is in this case advantageously embodied such that in the second position it projects further from the valve body than in the first position. This avoids a pinning of the operating device onto the valve body as long as the valve body is not screwed back into its first position in order to prepare the valve for the next release.

DESCRIPTION WITH REFERENCE TO THE FIGURES

In the following, now one aspect of the invention is described with reference to the enclosed Figures. In the drawings.

Figure 1:
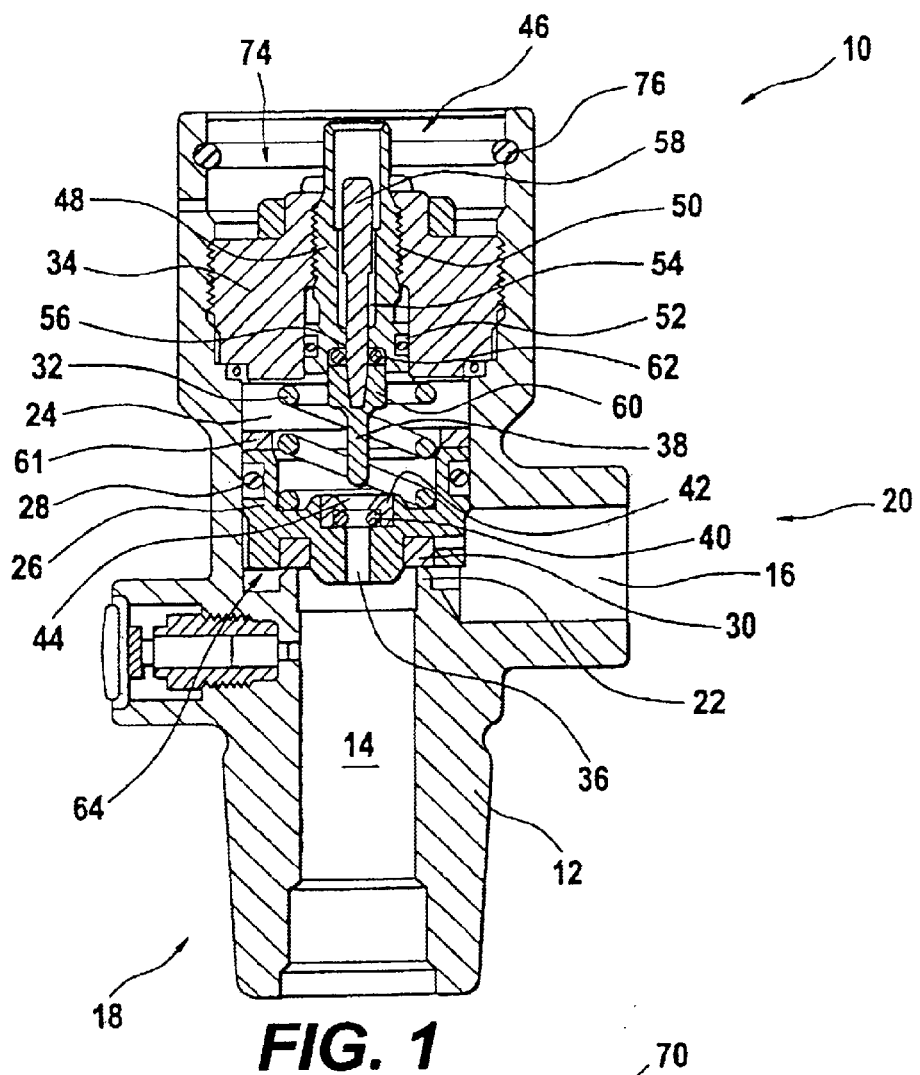
FIG. 1 shows a longitudinal section through a valve with a control valve according to the invention, the valve being closed and the control valve not being operated.

The valve 10 shown in FIGS. 1 to 5 is a container valve for tripping stationary fire extinguishing plants. It is particularly suitable for the high-pressure range (i.e. of about 60 to 300 bar) among others with inert gas or carbon dioxide as extinguishing substance.

The valve 10 has a differential pressure design. It comprises a valve body 12 with an inlet channel 14 and an outlet channel 16. The inlet channel 14 is embodied in a screwed socket 18 which is screwed into an extinguishing substance container (not shown). The outlet channel 16 is accommodated in a lateral connecting socket 20 of the valve body 12. Between the inlet channel 14 and the outlet channel 16, a valve seat 22 is arranged. A tripping chamber 24 is axially opposite the valve seat 22 in the valve body 12.

Reference numeral 26 designates a closing piston which is introduced in the tripping chamber 24 with its rear end so as to seal it. Here, the sealing is effected via an O-ring 28 which is inserted in a surrounding groove of the closing piston 26. At its leading end, the closing piston 26 comprises a front sealing ring 30 with which it can be pressed to the valve seat 22. In the tripping chamber 24, a closing spring 32 is assigned to the closing piston 26 which exerts a spring force thereon in the direction of the valve seat 22, at the same time being supported by a screwed plug 34 which is screwed into the valve body 12 so as to seal it and axially defines the tripping chamber 24. The closing piston 26 is axially transversed by a pressure compensation channel 36 via which the tripping chamber 24 is in a pressure communication with the inlet channel 14.

In the axial extension of the pressure compensation channel 36, in the tripping chamber 24 a pin 38 is arranged. The latter can be axially introduced into the pressure compensation channel 36 (see FIGS. 2 and 3), an O-ring 40 ensuring a radial sealing of the pin 38 in the channel 36. (The pin 38 consequently forms a sealing element of the pressure compensation channel 36 and is hereinafter referred to as "sealing pin 38".) It should be noted that the O-ring 40 is fixed in the closing piston 26 by means of an annular piece 42, this annular piece 42 forming at its front end a conical cavity 44 for introducing the rounded tip of the sealing pin 38 into the pressure compensation channel 36 in a self-locating manner.

Reference numeral 46 designates a control valve which is built into the screwed plug 34 in the axial extension of the pressure compensation channel 36. This control valve 46 comprises a control valve sleeve 48 which is screwed into an axial threaded bore 50 of the screwed plug 34 and is radially sealed below this threaded bore 50 by means of an O-ring 52 in a cylindrical chamber of the screwed plug 34. The control valve sleeve. 48 is axially transversed by a vent channel 54 and comprises a control valve seat 56 towards the tripping chamber 24 via which the vent channel 54 ends in the tripping chamber 24. In the vent channel 54, an operating tappet 58 is mounted with a radial clearance. This operating tappet 58 supports a closing body 60 in the tripping chamber 24 which is assigned to the control valve seat 56 such that the pressure in the tripping chamber 24 presses the closing body 60 axially against the control valve seat 56. In the process, an O-ring 62 at the closing body 60 seals the vent channel 54 against the tripping chamber 24. The operating tappet 58 makes it possible to press the closing body 60 from the outside into the tripping chamber 24, i.e. away from the control valve seat 56, resulting in the venting of the tripping chamber 24 via the vent channel 54. It should be noted that the sealing pin 38 is a projection of the closing body 60. As the operating tappet 58 is mounted in the vent channel 54 with a radial clearance, the sealing pin 38 has sufficient free motion for centering itself easily in the pressure compensation channel 36.

By means of the FIGS. 1 to 5, now the functioning of the valve 10 is described.

In FIG. 1, the valve is in the non-released position of rest. The container pressure prevailing in the inlet channel 14 has also constituted in the tripping chamber 24. As the cross-section sealed in the tripping chamber 24 by the O-ring 28 is essentially larger than the sealed cross-section at the valve seat 22 and moreover an atmospheric pressure prevails in the outlet port 16, a positive force of pressure acts on the closing piston 26 in the direction of the valve seat 22. The larger the container pressure, the larger is this positive force of pressure, so that it is always ensured that the valve 10 securely blocks a high gas pressure in the container until the plant is released. It should be noted that the container pressure also keeps the control valve 46 in the closing position.

If the valve 10 is to be released, the valve tappet 58 has to be pressed inwards, so that it presses the closing body 60 away from the control valve seat 56 resulting in the venting of the tripping chamber 24 via the vent channel 54. It should be noted that the force required for the release is relatively small as the cross-section of the control valve seat 56 is very small. As soon as the tripping chamber 24 is vented via the control valve 46, the pressure in the tripping chamber 24 drops. The positive force of pressure acting on the closing piston 26 consequently becomes smaller and finally even becomes negative, i.e. it now acts in the direction of the screwed plug 34. If this negative force of pressure becomes larger than the spring force acting in the direction of the valve seat 22, the closing piston 26 is lifted from the valve seat 22 and is accelerated in the direction of the screwed plug 34. In the process, the sealing pin 38 penetrates the pressure compensation channel 36 and seals the latter. Now, no more compressed gas can flow via the pressure compensation channel 36 into the tripping chamber 24 and the closing piston 26 is accelerated in the direction of the screwed plug 34. Reference numeral 61 in FIG. 1 designates an annular buffer element from an elastic material which is fixed at the front of the closing piston 26 and essentially comprises the same external diameter as the tripping chamber 24. This relatively large-surface buffer element effectively cushions the impact of the accelerated closing piston 26 on the screwed plug 34 without a sealing face being damaged in the process.

Figure 2:
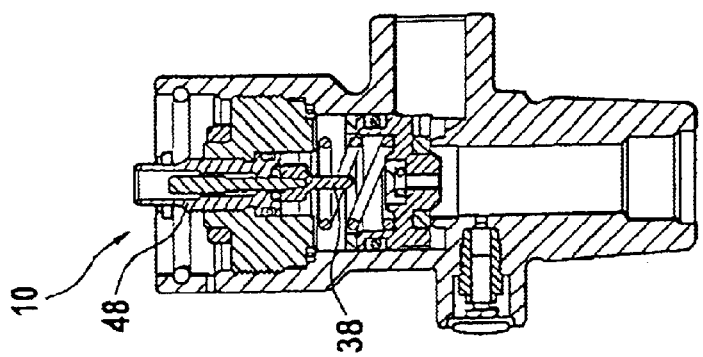
FIG. 2 shows a longitudinal section as in FIG. 1 directly after the release, the valve being open and the control valve being operated.

In FIG. 2, the valve is shown in a position in which the closing piston 26 in the end position abuts the screwed plug 34, the control valve 46 still being operated, i.e. opened. The arrow represents a force of operation which presses the operating tappet 58 downwards. The sealing pin 38 should also be noted, which projects into the pressure compensation channel 36 and seals the latter in the O-ring 40, so that no more compressed gas can flow into the tripping chamber 24.

Figure 3:
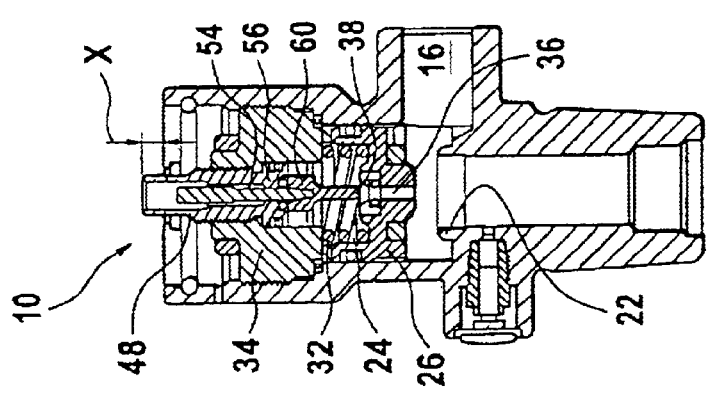
FIG. 3 shows a longitudinal section as in FIG. 1 during the emptying of the extinguishing substance, the valve being open and the control valve being in the meantime operated again.

In FIG. 3, the valve is shown in a position in which the closing piston 26 in the end position abuts the screwed plug 34, the control valve 46, however, is now non-operated, i.e. closed. No more force of operation now acts on the operating plug 58, so that the pressure in the pressure compensation channel 36 presses the sealing pin 38 upwards resulting in the closing body 60 being again pressed against the control valve seat 56 with its O-ring 62 and closing the control valve 46. It should be noted that the valve 10, however, still remains securely opened as no essential counter-pressure can constitute in the tripping chamber 24 via the pressure compensation channel 36 closed by the sealing pin 38.

When emptying the container, the force of pressure acting on the closing piston 26 in the direction of the screwed plug 34 becomes gradually smaller. If this force of pressure finally becomes smaller than the spring force of the closing spring 32, the closing spring 32 moves the closing piston 26 into the direction of the valve seat 22. Thereby, a light negative pressure constitutes in the tripping chamber 24 which in turn opens the control valve 46 so that more external air can flow into the tripping chamber 24 and the closing piston 26 can continue its closing movement up to the valve seat 22.

Figure 4:
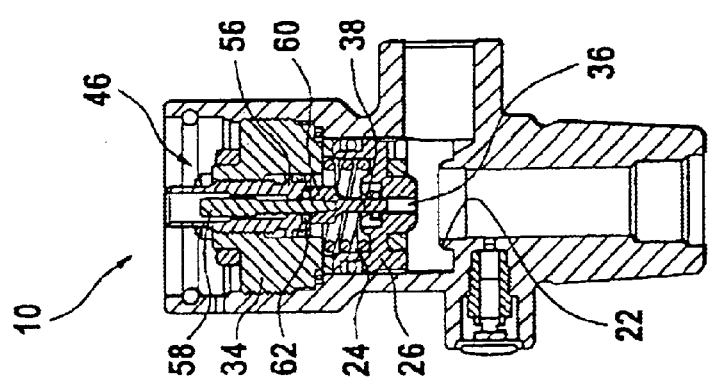
FIG. 4 shows a longitudinal section as in FIG. 1 during the filling, the valve being open and the control valve being in the filling position.

In FIG. 4, the valve 10 is shown during the filling of the container. It should be noted that the control valve sleeve 48 is screwed out of the screwed plug 34 by a certain distance X. In this position, the sealing pin 38 of the closing body 60 abutting the control valve seat 56 is in the filling position, i.e. it can no longer seal the pressure compensation channel 36. The filling of the container is now effected via the outlet channel 16. At the beginning of the filling operation, the filling pressure here acts on the annular face 64 of the closing piston 26 surrounding the valve seat 22 (see FIG. 1). The force of pressure resulting therefrom is greater than the spring force acting in the direction of the valve seat 22, so that the closing piston 26 is lifted from the valve seat 22 and is accelerated in the direction of the screwed plug 34. At the same time, the closing body 60 freely hanging into the tripping chamber 24 is accelerated in the direction of the control valve seat 56 and pressed against the control valve seat 56 by the pressure which constitutes via the pressure compensation channel 36 in the tripping chamber 24, so that the vent channel 54 is sealed. As long as the filling flow flows in through the outlet channel 16 at a high speed, important forces of flow act on the closing piston 26 and keep it away from the valve seat 22 against the spring force of the closing spring 32. If, however, the filling flow is interrupted, the dynamic forces of pressure acting on the closing piston 26 disappear. The resultant of the static forces of pressure acting on the closing piston 26 also equals zero as the sealing pin 38 is in the filling position and the container pressure can consequently constitute via the open pressure compensation channel 36 in the tripping chamber 24. The closing piston 26 is thus in pressure equilibrium and is now pressed onto the valve seat 22 by the spring force of the closing spring 32. To summarize, one can say that the valve 10 closes immediately after the interruption of the filling flow if the sealing pin 38 has been brought into its filling position before the filling process by partly screwing out the control valve sleeve 48.

Instead of bringing the sealing pin 38 into its filling position before the filling operation by partly screwing out the control valve sleeve 48, it is also possible to effect the filling with the sealing pin 38 being in the sealing position. With this procedure, the valve 10 is only closed by partly screwing out the control valve sleeve 48 after the interruption of the filling flow. This procedure is to be employed in particular if the forces of flow with the sealing pin 38 being in the filling position are not sufficient during the filling for retaining the closing piston 26 in an open position.

Figure 5:
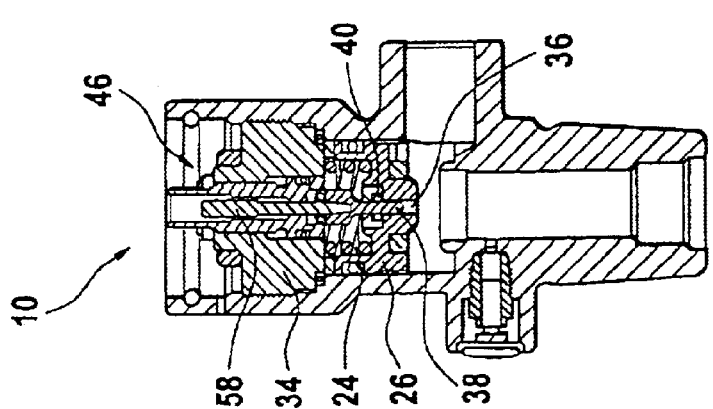
FIG. 5 shows a longitudinal section as in FIG. 1 after the filling, the valve being again closed and the control valve still being in the filling position.

The position of the valve after the interruption of the filling flow is shown in FIG. 5. In order to achieve the rest position ready to be released in FIG. 1, the control valve sleeve 48 only has to be screwed back into its starting position in which the sealing pin 38 is in its so-called sealing position.

In the shown valve 10, the operation of the sealing pin 38 between the sealing position and the filling position is consequently effected by screwing the control valve sleeve 48 between a first and a second position. The end of the control valve sleeve 48 projecting out of the screwed plug 34 is in this case advantageously designed to place a handwheel thereupon (not shown), so that the operation of the sealing pin 38 between the sealing position and the filling position can be effected as the opening and closing of a normal valve. As shown in FIGS. 4 and 5, the control valve sleeve 48 projects in its second position, i.e. in the filling position of the sealing pin 38, further from the screwed plug 34 than in its first position, i.e. in the sealing position of the sealing pin 38 (see FIGS. 1, 2 and 3). This prevents an operating device from being placed upon the valve body if the sealing pin 38 is not in its sealing position.

Figure 6:
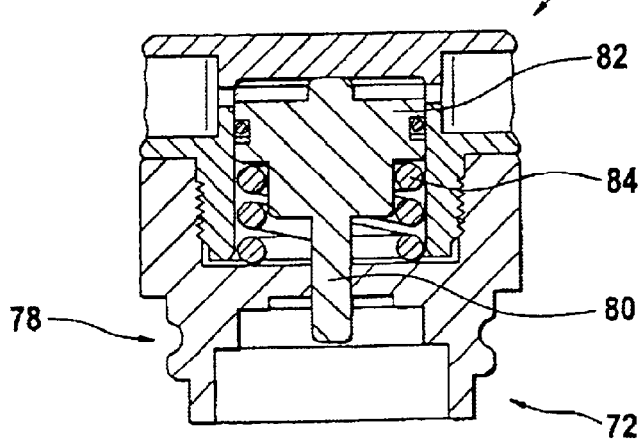
FIG. 6 shows a longitudinal section through an operating device for the control valve.

Such an operating device 70 is shown in FIG. 6. It comprises a base 72 which can be axially inserted into a complementarily designed holder 74 at the face of the valve body 12 and is secured therein by means of a lock washer 76 which locks into place in an annular groove 78 at the base 72. It is obvious that the base 72 cannot be secured in the holder 74 as long as the control valve sleeve 48 is not screwed into the screwed plug 34 up to its first position.

Reference numeral 80 in FIG. 6 designates a tappet. If the operating device 70 is secured with its base 72 in the holder 74 at the face of the valve body 12, the tappet 80 makes it possible to press down the operating tappet 58 in the control valve sleeve 48 in order to open the control valve.

In the operating device 70 of FIG. 6, the tappet 80 is connected with a pressure piston 82 which can be supplied with a pressure medium. Here, a readjusting spring 84 fixes a retracted position of rest of the tappet 80.

It is, however, an advantage of the described valve that it can be easily equipped with various operating devices which are with their standard bases simply inserted into the holder 74 at the front of the valve body 12. It should be in particular noted that the exchange of the operating device can be even effected without problems in the valve 10 on which a pressure acts. As for the opening of the control valve 46 relatively small tripping forces are required, it is easily possible to employ even relatively weak operating devices, such as electromagnetic or thermal operating devices, with the valve 10.

What is claimed is:

1. A container valve for a stationary fire extinguishing system comprising:
    a valve body with an inlet channel and an outlet channel, a valve seat arranged between said inlet channel and said outlet channel and a tripping chamber axially opposed to said valve seat;
    a closing piston movable within said valve body axially relative to said valve seat, said closing piston having a first end and an opposite second end, said first end axially sealing said tripping chamber and defining therein a pressure surface, said second end having a sealing surface thereon with which it can be pressed against said valve seat, said closing piston further including a pressure compensation channel via which said tripping chamber is in pressure communication with said inlet channel when said closing piston sits on said valve seat;
    a closing spring which is associated with said closing piston so that it exerts a spring force on said closing piston in the direction of said valve seat;
    a tripping device in communication with said tripping chamber, said tripping device being capable of generating a pressure drop in said tripping chamber;
    a limit stop for said closing piston in said valve body, said limit stop defining an end position for said closing piston when a differential pressure lifts the closing piston from said valve seat and moves it away from the latter; and
    a sealing element movable between a sealing position and a filling position, wherein:
        in said sealing position, said sealing element seals off said pressure compensation channel in said closing piston when the latter is in its end position; and
        in said filling position, said sealing element opens said pressure compensation channel in said closing piston when the latter is in its end position.

2. The valve according to claim 1, comprising actuation means for actuating said sealing element from outside of said valve body and moving said sealing element between said sealing position and said filling position.

3. The valve according to claim 2, wherein:
    said sealing element comprises a pin capable of being inserted into said pressure compensation channel and to co-operate therein with an O-ring for sealing off said pressure compensation channel.

4. The valve according to claim 1, wherein:
    said sealing element comprises a pin capable of being inserted into said pressure compensation channel and to co-operate therein with an O-ring for sealing off said pressure compensation channel.

5. The valve according to claim 4, further including an annular buffer element associated with said closing piston so as to co-operate with said limit stop when said closing piston is urged in its end position, said annular buffer element having essentially the same outer diameter as said tripping chamber.

6. The valve according to claim 1, wherein said tripping device comprises a control valve.

7. The valve according to claim 6, wherein said control valve comprises:
    a vent channel ending in said tripping chamber;
    a control valve seat facing said tripping chamber;
    a control valve closing body associated with said control valve seat so that the pressure in said tripping chamber presses said control valve closing body axially against said control valve seat, whereby said control valve closing body seals said vent channel; and
    an operating tappet for pressing said control valve closing body away from its control valve seat.

8. The valve according to claim 7, wherein
    said control valve is arranged in axial extension of said pressure compensation channel in said closing piston, and
    said sealing element is formed by a pin provided on said control valve closing body, wherein said pin is capable of being inserted into said pressure compensation channel and to co-operate therein with an O-ring for sealing off said pressure compensation channel.

9. The valve according to claim 8, wherein said control valve comprises a control valve sleeve in which said vent channel and said control valve seat are arranged, said control valve sleeve being screwable from the outside between a first position and a second position, wherein:
    in said first position, said pin seals said pressure compensation channel via said O-ring if said control valve closing body abuts said control valve seat and said closing piston is in its end position; and in said second position, said pin opens said pressure compensation channel to said tripping chamber if said control valve closing body abuts said control valve seat and said closing piston is in its end position.

10. The valve according to claim 9, wherein said tripping device further comprises an operating device for said control valve to be placed upon said valve body; and in said second position, said control valve sleeve sufficiently projects from said valve body to prevent a placing of said operating device onto said valve body.

11. The valve according to claim 10, wherein said operating device comprises a base which is axially inserted into a complementarily designed holder in said valve body and secured therein by means of a lock washer.

* * * * *